May 19, 1936.  W. J. NEWMAN  2,041,013
METHOD OF EXCAVATING MATERIAL AND MACHINE THEREFOR
Filed March 25, 1933  2 Sheets-Sheet 1
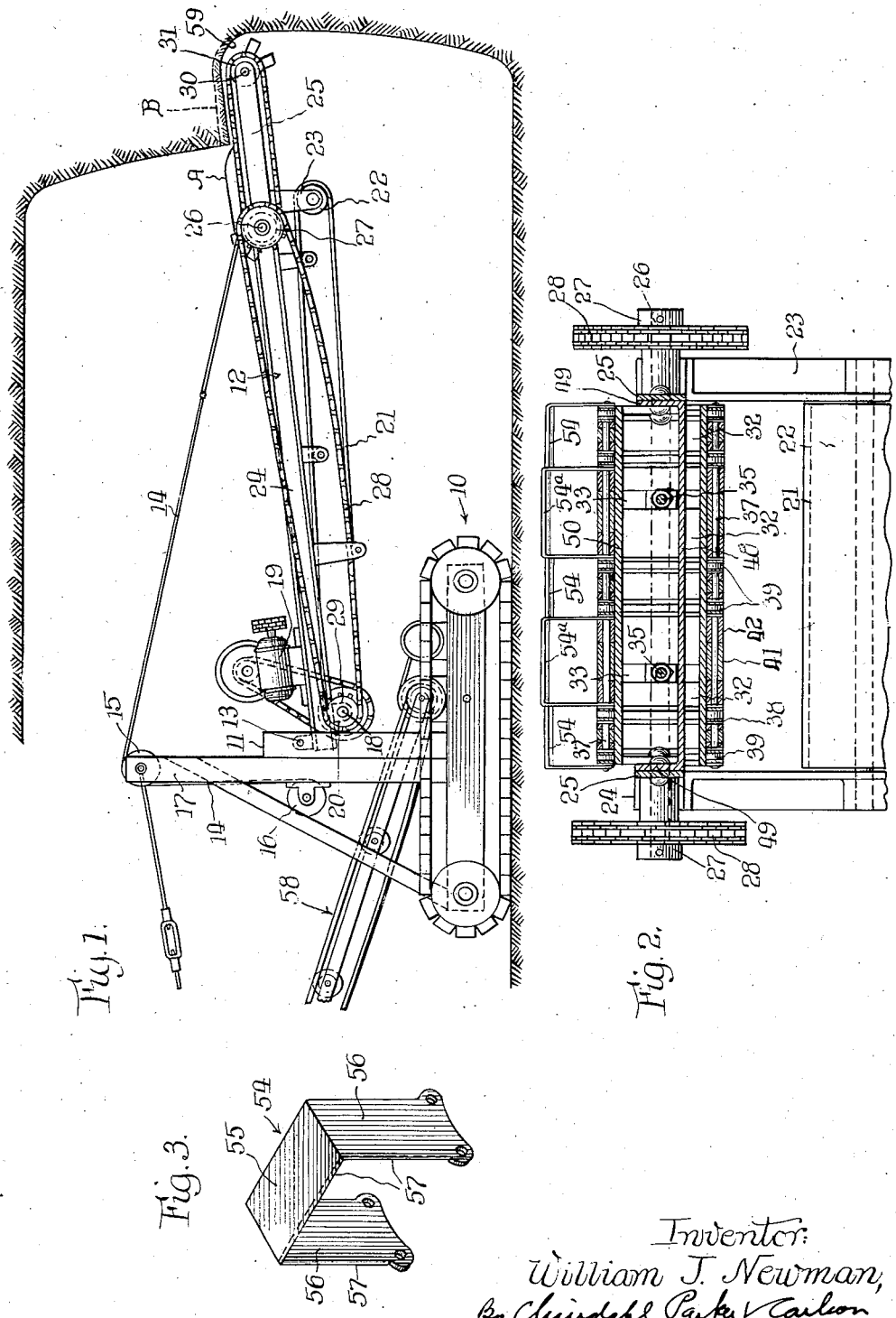

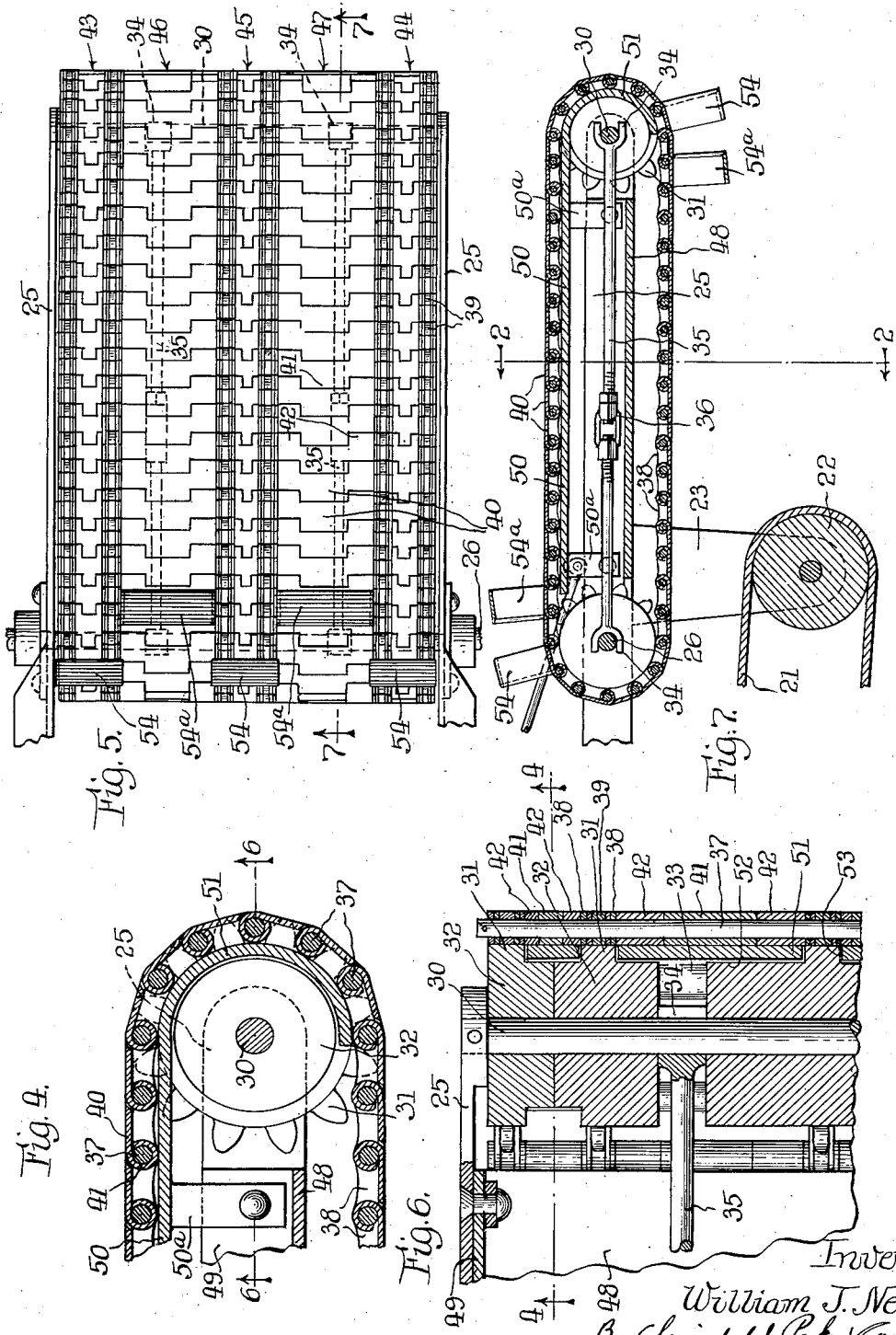

Patented May 19, 1936

2,041,013

UNITED STATES PATENT OFFICE 2,041,013

METHOD OF EXCAVATING MATERIAL AND MACHINE THEREFOR

William J. Newman, Chicago, Ill.

Application March 25, 1933, Serial No. 662,765

13 Claims. (Cl. 37—192)

The invention relates generally to a method of excavating and to a machine therefor and more particularly to a method and machine which are especially adapted for working in clay or similar material.

A general object of the invention is to provide a novel method and machine for the aforesaid purpose which are simple, rapid and efficient.

An object is to provide a novel method of excavating clay and similar materials, which, because of their nature, are exceedingly difficult to work.

Another object is to provide a novel method of excavating wherein the material is cut from the top wall of a horizontal recess in strips in such manner that the removal of the material may be rapidly accomplished with a minimum expenditure of power.

Another object is to provide a new and improved machine which is particularly efficient in tunneling operations especially when working in clay, gumbo, or similar materials of an inherently cohesive nature.

Another object resides in the provision, in a machine of this character, of undercutting means capable of starting the cut from a blank wall or surface and of making a cut of substantial depth inwardly from said wall.

In conjunction with the foregoing, another object is to provide cutting means embodying a number of cutting elements operating to remove parallel strips lengthwise of the cut.

More specifically stated, an object is to provide, in such a machine, a series of cutting elements arranged to remove spaced parallel strips of material, there being other cutting elements for subsequently removing the remaining, intervening strips of material.

Other objects of the invention are to provide an endless conveyer having cutting elements thereon arranged in transverse series for removing material, from across the width of a cut, in strips and depositing such material on the conveyer, and to provide novel means and part relationships for imparting strength and rigidity to the structure.

In the drawings:

Figure 1 is a side elevation on a reduced scale of an excavating machine embodying the features of the invention.

Fig. 2 is a transverse section across the cutter conveyer assembly taken as indicated by the section line 2—2 of Fig. 7.

Fig. 3 is an enlarged perspective view of one of the cutting elements.

Fig. 4 is a fragmentary longitudinal section showing one end of the cutter conveyer assembly taken as indicated by the line 4—4 of Fig. 6.

Fig. 5 is a plan view of the cutter conveyer assembly.

Fig. 6 is a detail view in section and is taken along the line 6—6 of Fig. 4.

Fig. 7 is a longitudinal vertical section taken as indicated by the line 7—7 of Fig. 5.

While the invention is susceptible of various modifications and alternative constructions, I have shown in the drawings and will herein describe in detail the preferred embodiment, but it is to be understood that I do not thereby intend to limit the invention to the specific form disclosed, but intend to cover all modifications and alternative constructions falling within the spirit and scope of the invention as expressed in the appended claims.

Primarily the method is intended to be used in performing an undercutting operation and consists generally in first forming a horizontal recess in a vertical wall and then removing the top wall of said recess in small elongated sections or strips in such manner that the strips fall or are deposited by their own weight on a conveyer for removal to a disposal point. Obviously, however, certain steps in the method will be available for use in connection with other excavating operations than undercutting. Preferably, in order to minimize power requirements, certain of the strips of material are comparatively narrow with respect to the remaining strips and the cutting operation, by which the narrower strips are freed, is performed in advance of or prior to the feeding of the wider strips. The effect of this procedure is that, in the top wall of a recess, narrow and spaced strips of material are first removed, after which the remaining wider portions are cut away.

One preferred form of the invention has been shown, merely for illustrative purposes, as being embodied in a machine organization which in certain respects resembles that shown in the patent to John P. Carroll and myself, No. 1,763,810, issued June 17, 1930. Referring to the drawings, 10 designates generally a conventional mobile truck or tractor upon which the excavating mechanism is mounted. From a suitable supporting base on the tractor a pair of transversely spaced posts or uprights 11 extend vertically, between which uprights an excavating boom 12 is mounted for vertical swinging movement about a horizontal pivot 13. Such means as a cable 14, pulley 15, and winch 16 supported on a frame 17 are provided for effecting vertical adjustment of the boom. If desired, the boom and the supporting parts therefor may be mounted on a table or the like which is rotatable about a vertical axis whereby to effect transverse or horizontal adjustment of the boom.

A main drive shaft 18, suitably journaled on the boom, is driven by a motor 19 through any well-known type of change speed power transmission. The shaft 18 drives a drum 20 about which an endless conveyer 21 passes, the front end of said conveyer being located at a distance inwardly of the front end of and below the boom. A drum 22 carried by brackets 23 supports the front end of the conveyer 21.

Preferably the boom comprises a pair of substantially parallel horizontally spaced channel beams 24, which are rigidly secured together in any suitable manner and terminate in flat end sections 25 herein shown as being integral extensions of the beams 24. Adjacent to the juncture of the beams 24 and end sections 25, a transverse shaft 26 is journaled (see Figs. 2 and 5). The ends of said shaft extend outwardly beyond each side of the boom and these ends have driving sprockets 27 (Fig. 2) rigidly secured thereon. Driving chains 28 extend between said sprockets and other driving sprockets 29 which are rigid with the main drive shaft 18 (Fig. 1). The shaft 26 is thus driven from the main drive shaft by driving means operating upon both ends of the shaft and the shaft 26 constitutes a drive shaft for a combined cutter and conveyer.

The combined cutter and conveyer structure embodies generally a flexible endless member which is supported by the end portions 25 of the boom in such manner that the upper run of the conveyer is horizontally disposed. The conveyer and the supporting end of the boom are arranged to be thrust bodily into a horizontal recess of substantial depth and the conveyer carries cutting elements which extend transversely substantially from side to side of the conveyer and are arranged to cut material from the top wall of the recess in long strips extending from the back to the front of the recess. While the conveyer may be of any suitable construction, that which is preferred comprises a unitary structure of substantial strength and rigidity.

Referring particularly to Figs. 6 and 7, the front ends of the end sections 25 support a transversely extending shaft 30 which parallels the conveyer drive shaft 26. Each of the shafts 26 and 30 supports a transverse series of sprockets 31 which, as shown in Fig. 6, have hubs 32 of substantial diameter. The hubs for the most part are of ample width to abut each other, thus providing a substantially continuous conveyer supporting means on each shaft. However, certain intermediate hubs are spaced apart, as indicated at 33, to allow forked ends 34 (Fig. 7) on longitudinally extending rods 35 to engage the shafts 26 and 30. Preferably such means as turnbuckles 36 are interposed in rods 35 for adjusting the length of said rods. The rods serve as supporting or reinforcing means for preventing bending of the shafts and in particular bending of the forward shaft 30.

It will be noted (see Fig. 2) that the preferred arrangement of the sprockets is in pairs of adjacent sprockets, each pair being spaced apart a greater distance than the distance between the sprockets constituting a pair. As shown, there are six sprockets comprising three pairs which are located respectively at opposite sides and centrally of the supporting shafts 26 and 30. A supporting rod 35 is positioned between adjacent pairs.

In its illustrated form, the conveyer comprises an endless system of sprocket engageable links alternating with other links fashioned to provide a conveying surface. Referring particularly to Figs. 4, 5 and 6, a plurality of elongated pivot rods 37 are connected one to another by sprocket links 38 arranged in spaced pairs, each pair being a sprocket chain properly arranged for engagement by a sprocket 31. Antifriction rollers 39, encircling the pivot rods, are preferably interposed between the links in each pair to maintain the spacing and reduce friction. Intermediate adjacent pairs of sprocket links and providing a surface extending therebetween are flat faced links comprising plates 40 having on one longitudinal side edge a central, pivot-rod-engaging curl 41 and on the opposite side edge similar but spaced curls 42 disposed to receive therebetween the central curl 41 of an adjacent link.

The above described construction provides a unitary endless conveyer which is longitudinally divided into sections by the sprocket chains. In the present instance there are five sections, of which the two side and the intermediate sections 43, 44 and 45 (Fig. 5) respectively are narrow and the intervening or alternating sections 46, 47 comparatively wide.

The upper run of the conveyer is rigidly supported against sagging and the end runs or bends are likewise reinforced, particularly the one at the front end of the conveyer. To this end, a plate 48 extends between the upper and lower runs of the conveyer and is rigidly secured through side flanges 49 to the end sections 25 of the boom. This plate strengthens the front end of the boom. An elongated reinforcing member 50 (Figs. 2, 4 and 7), constituting a bed over which the upper run of the conveyer travels, is suitably supported from the plate 48 and end sections 25 by brackets 50ª (Fig. 4). At least at the front end of the conveyer, the bed member 50 extends to the sprocket hubs and has an arcuate end section 51 fashioned to fit concentrically about the hubs.

The hubs are annularly recessed, as at 52 (Fig. 6) to receive the end section, said section of course being cut away, as at 53, to permit the sprockets to pass. A similar arrangement of parts may, if desired, be provided at the rear end of the conveyer. The reinforcement at the front end is important, however, since the cutting elements, to be presently described, first engage the material at the front end of the conveyer and the greatest stresses are there encountered.

While the cutting elements may be of other types, it is preferred to employ elements substantially similar to that shown in Fig. 3. Thus, each element comprises a generally U-shaped member 54 having a base 55 and side arms 56 through which the member is secured to the conveyer. One edge of the base and each side arm is sharpened to provide a cutting edge 57 and the elements are secured to the conveyer in any suitable manner so that this cutting edge 57 advances. The elements are of substantially the same size except for width, two of the elements, in this instance designated 54ª, being of ample width to straddle the sections of the conveyer 46, 47 defined by the wider flat face conveyer links. The other three elements 54 are dimensioned to traverse the remaining surfaces of the conveyer.

Although the cutting elements may be secured to the conveyer in any suitable manner, it is preferred to utilize the arrangement shown in Fig. 2 wherein the wider cutting elements 54a are bolted to the adjacent sides of the sprocket links 38 bordering sections 46, 47 and the narrower elements 54 are secured to the same line of links and (in the case of the two side elements) to the outer sprocket links 38. Since the cutting elements are of substantially the same depth, this arrangement provides a continuous cutting surface which is evenly spaced from the face and extends transversely of the conveyer. Moreover the elements are offset longitudinally of the conveyer in staggered relation, as may best be seen in Figs. 5 and 7, whereby the adjacent sides 56 of the narrow and wide cutting elements overlap slightly. Preferably the elements are offset a distance at least approximating the width of the cutting elements from front to rear with the narrower cutting elements positioned in advance of the wider elements. In the present embodiment, two transverse sets of cutting elements are provided, these elements being spaced equidistantly apart on the conveyer.

The operation of the machine can best be considered with reference to Fig. 1. The operator, wishing to remove material from a vertical wall, moves the tractor 10 and adjusts the boom 12 so that the front end of the cutter and conveyer engages the vertical wall usually near the bottom thereof. The conveyer is driven so that the upper run thereof moves rearwardly of the boom, the underlying conveyer 21 of course being similarly driven. When the conveyer and cutting elements thereon are so driven, the elements are moved into engagement with the material to be removed and the narrow cutting elements 54 being in advance of the wide cutting elements 54a first sever a narrow strip of material, after which the wide elements free the intervening material remaining. This operation, coupled with successive advances of the tractor 10, continues until a horizontal recess in the vertical wall has been formed to a depth which is somewhat less than half the length of the conveyer. It should be noted that the front end of the boom is substantially the same width as the cut made by the cutting elements whereby the boom may readily follow the front end of the conveyer into the recess.

The boom is now raised by successive steps to cause the cutting elements to remove material in elongated strips from the top wall of the recess, first in narrow spaced strips followed by removal of the wider remaining strips. The material as it is freed drops by gravity onto the underlying face of the conveyer and, after it has been entirely loosened, is drawn rearwardly and deposited upon the conveyer 21. At the rear of the conveyer 21 the material may be deposited upon a second conveyer 58 for removal to a disposal point. When the machine is operating upon clay, gumbo, or similar materials which are inherently coherent, the small section of material designated 59 which is cut away in front of the extreme front end of the boom remains attached to the main body of the strip of material and is removed therewith.

If desired, only a single transverse set of cutting elements may be employed in which event the boom may be thrust substantially its full length into the horizontal bore. More rapid operation, however, obtains if two sets of cutting elements are utilized, a somewhat shorter horizontal stroke employed, and the boom raised each time the cutting elements have freed the several strips of material and the conveyer has moved said strips from beneath the top wall of the recess to permit such movement of the boom.

This method of excavating is advantageous since thereby a large amount of material may be quickly and efficiently removed with minimum power requirements. Moreover, from an operating standpoint the method possesses an important advantage. For example, when a tunnel is being driven through material which has a decided tendency to sag, the invention may be used to produce horizontal cuts of desired size in small sections located at any point in the vertical wall, after which reinforcement, in the form of shoring or the like, may be employed to support the relatively small surfaces which have been exposed in making the cut. Consequently, as the tunnel progresses, sagging or collapsing of the walls may be entirely prevented.

I claim as my invention:

1. An excavating machine comprising, in combination, an adjustable boom, a conveyer structure supported by the outer end of said boom comprising a plurality of transversely spaced sprocket chains, two sets of sprockets operatively engaging said chains, means for driving one set of sprockets, endless systems of links intermediate transversely adjacent sprockets providing continuous supporting and conveying surfaces, connector means carried by said chains, and individual cutting elements connected to said sprocket chains by said connector means and arranged to provide a cutting surface extending across the surface of said structure.

2. A cutting device for an excavating machine comprising, in combination, an endless flexible member of substantial width having one run of substantial length, groups of cutting means extending transversely of and spaced outwardly from the surface of said member and having an advancing cutting edge, and perpendicular cutting means having advancing cutting edges extending between said member and said first mentioned cutting means of each group, whereby the material is removed in a plurality of parallel strips, each group of cutting means being arranged to travel substantially the length of said run before the next group becomes operative to remove strips.

3. A cutting device for an excavating machine comprising, in combination, an endless flexible member of substantial width having one run of substantial length, alternating narrow and wide cutting elements of substantially U-shape secured to extend across and outwardly from the surface of said member and having an open face thereof facing forwardly, the narrower of said elements being located in advance of the wider elements to effect an initial cutting away of narrow spaced strips of material followed by removal of the remaining material.

4. A cutting device for an excavating machine, comprising the combination of an endless flexible member having an elongated run adapted to be positioned adjacent to a surface to be worked, a plurality of U-shaped cutting means on said member fashioned to free the material in strips, said cutting means having cutting edges parallel with said run and angularly disposed legs connected to said member and being in groups toward the ends of said run whereby one group will completely sever the strips cut thereby before the other group begins cutting, and means for supporting and driving said member.

5. In an excavating machine, an undercutting device comprising the combination of an endless flexible member fashioned to be thrust bodily into a recess formed in the face of an upright wall and having a generally horizontal upper run adapted to be brought into position underlying and adjacent to the top wall of said recess, a plurality of U-shaped cutting means fashioned to remove material in strips and having legs extending toward and connected to said member, said cutting means being arranged in groups spaced longitudinally of said member and leaving said member free between the groups to receive the strips of material, certain of said cutting means in each group being located to cut in advance of the others, and means for supporting and driving said member.

6. A cutting device for an excavating machine comprising, in combination, an endless flexible member of substantial width having one elongated run, groups of substantially U-shaped cutting elements secured to extend across and outwardly from the surface of said member with an open face thereof facing forwardly and having advancing cutting edges, each of said elements having a pair of spaced legs extending toward and connected with said member, certain of said elements in each group being located in advance of the other elements and having the side edges thereof overlapping the side edges of the following elements whereby successive longitudinal strips of material are completely removed in making the entire cut, and each of said groups of cutting elements being spaced substantially from the following group to permit the deposit of the cut strip on said member.

7. An excavating machine comprising, in combination, an adjustably supported boom having side frame members, spaced transverse shafts journaled in said members near the outer ends thereof, an endless conveyer, supporting and driving means on said shafts for said conveyer, and two transversely disposed sets of cooperating cutting elements on said conveyer located substantially equidistantly apart when measured in either direction longitudinally of the conveyer and thereby adapting each set for completing a cut before the other set is carried into cutting position, each set comprising individual elements each fashioned to provide a cutter extending outwardly from said conveyer to remove a separate strip of material and being arranged in staggered relation so that certain elements cut continuous spaced strips in advance of others.

8. An excavating machine comprising in combination, an elongated boom, a conveyer at the outer end of said boom and having a movable flexible carrying surface of substantial width for receiving and carrying excavated material, longitudinally spaced rotatable guiding and driving means on said boom for said conveyer, cutting elements on said conveyer disposed transversely thereof, and fixed means for rigidly supporting the upper and outer end runs of said carrying surface, said fixed means extending arcuately in engagement with the inner face of the outer end of the conveyer for resisting pressure and preventing sag of said surface incident to severance of material by said elements.

9. The combination in an excavating machine of an elongated boom, an endless type conveyer on said boom having a carrying surface of substantial width arranged to travel over the outer end of the boom and carry severed material toward the inner end of the boom, rotary means for driving said conveyer, a plurality of cutting elements on said conveyer disposed transversely thereof, means providing a substantially continuous transverse rotary conveyer support for the inner end of the conveyer and a part underlying and rigidly supporting said carrying surface and preventing sag under the load imposed by the severed material, the outermost end of said fixed means being arcuate in form and serving as a bearing in engagement with the inner face of said carrying surface, permitting unrestricted movement of the conveyer and maintaining the cutters in a given horizontally alined position when forced into the material being operated upon.

10. The combination in an excavating machine of an elongated boom, an endless type conveyer arranged to travel over the outer end of said boom and comprising spaced parallel sprocket chains and flexible endless means connected to said chains and movable therewith for carrying severed material, cutters connected to said sprocket chains and adapted to sever material when moving in contact therewith upon movement of said conveyer, rotary means for driving said conveyer, a rotary conveyer support for the inner end of the conveyer, spaced sprockets rotatably mounted on the outer end of said conveyer and adapted to engage said sprocket chains for maintaining the same in a defined path of movement, and fixedly mounted arcuate means underlying the outer end of the conveyer between said sprockets and providing a bearing surface over which said endless means moves while said cutters are forced through the material being severed and serving to prevent said endless means from sagging due to pressure exerted by the severed material.

11. An excavating machine comprising, in combination, an adjustably supported boom having substantially coextensive side frame members, spaced transverse shafts journaled in said members near the outer ends thereof, an endless conveyer, supporting and driving means on said shafts for said conveyer, and a set of cutting elements extending transversely of said conveyer and comprising elements with short blades adapted to sever completely long narrow strips and thereby segregate spaced wider strips, and elements with longer blades adapted to detach said wider strips, all of the elements with short blades being disposed in transversely spaced relation one to the other and in staggered relation in advance of the elements with longer blades, said set of elements being arranged in advance of a run of said conveyer of substantial length and free of obstructions so that substantially the full length of the severed strips may be carried on the conveyer.

12. In an excavating machine having a boom including an endless conveyer and fashioned to be thrust bodily into a recess formed in the face of an upright wall of relatively compact material to be excavated with a run of the conveyer adjacent a wall defining the recess, a plurality of cutters arranged in a staggered row transversely of the conveyer and comprising alternate front and rear cutters adapted to remove a complete aggregate transverse layer of substantially uniform cross section from said wall during a cutting stroke, said front cutters being arranged to sever narrow strips of material in advance of said rear cutters so as to segregate parallel wider portions of material and relieve pressure on the rear cutters and said rear cutters being arranged to sever said segregated portions and complete removal of said transverse layer.

13. The method of excavating material which consists in forming a recess of substantial depth in the upright face of the material to be removed, and cutting an aggregate layer of substantial and uniform depth from the top wall of the recess by first completely removing a series of narrow parallel strips of material spaced transversely of the cut to leave a segregated wider strip intermediate each two next adjacent narrow strips and then removing the wider intermediate strip to complete the full cut.

WILLIAM J. NEWMAN.

CERTIFICATE OF CORRECTION.

Patent No. 2,041,013. May 19, 1936.

WILLIAM J. NEWMAN.

It is hereby certified that error appears in the printed specification of the above numbered patent requiring correction as follows: Page 1, second column, line 36, for the word "feeding" read freeing; and that the said Letters Patent should be read with this correction therein that the same may conform to the record of the case in the Patent Office.

Signed and sealed this 18th day of August, A. D. 1936.

(Seal)

Henry Van Arsdale
Acting Commissioner of Patents.